(12) United States Patent
Blake et al.

(10) Patent No.: US 7,720,282 B2
(45) Date of Patent: May 18, 2010

(54) STEREO IMAGE SEGMENTATION

(75) Inventors: Andrew Blake, Redmond, WA (US); Antonio Criminisi, Redmond, WA (US); Geoffrey Cross, Redmond, WA (US); Vladimir Kolmogorov, Redmond, WA (US); Carsten Curt Eckard Rother, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1298 days.

(21) Appl. No.: 11/195,027

(22) Filed: Aug. 2, 2005

(65) Prior Publication Data

US 2007/0031037 A1 Feb. 8, 2007

(51) Int. Cl.
G06K 9/34 (2006.01)

(52) U.S. Cl. .................. 382/173; 382/154; 382/175; 382/275; 382/180; 382/274; 348/340; 348/157; 345/619

(58) Field of Classification Search .............. 382/154, 382/173, 175, 275, 277, 180, 274; 348/340, 348/157, 159, 14.16, 14.12; 345/619
See application file for complete search history.

(56) References Cited

U.S. PATENT DOCUMENTS

| | | | |
|---|---|---|---|
| 6,606,406 B1 * | 8/2003 | Zhang et al. | 382/154 |
| 6,865,289 B1 * | 3/2005 | Berestov | 382/154 |
| 6,891,966 B2 * | 5/2005 | Chen | 382/145 |
| 7,043,084 B2 * | 5/2006 | Beardsley | 382/224 |
| 7,085,409 B2 * | 8/2006 | Sawhney et al. | 382/154 |
| 2003/0218672 A1 * | 11/2003 | Zhang et al. | 348/14.16 |
| 2005/0078865 A1 | 4/2005 | Criminisi et al. | |
| 2005/0271273 A1 | 12/2005 | Blake et al. | |

OTHER PUBLICATIONS

Microsoft Research Cambridge, "i2i: 3D Visual Communication", http://web.archive.org/web/20040607194725/research.microsoft.com/vision/cambridge/i2i/ http://web.archive.org/web/20050402075554/research.microsoft.com/vision/cambridge/i2i/.

(Continued)

*Primary Examiner*—Samir A. Ahmed
*Assistant Examiner*—Ali Bayat

(57) ABSTRACT

Real-time segmentation of foreground from background layers in binocular video sequences may be provided by a segmentation process which may be based on one or more factors including likelihoods for stereo-matching, color, and optionally contrast, which may be fused to infer foreground and/or background layers accurately and efficiently. In one example, the stereo image may be segmented into foreground, background, and/or occluded regions using stereo disparities. The stereo-match likelihood may be fused with a contrast sensitive color model that is initialized or learned from training data. Segmentation may then be solved by an optimization algorithm such as dynamic programming or graph cut. In a second example, the stereo-match likelihood may be marginalized over foreground and background hypotheses, and fused with a contrast-sensitive color model that is initialized or learned from training data. Segmentation may then be solved by an optimization algorithm such as a binary graph cut.

12 Claims, 14 Drawing Sheets

OTHER PUBLICATIONS

Microsoft Research Cambridge, "i2i: 3D Visual Communication Test stereo image and sequence pairs", http://web.archive.org/web/20040602063008/research.microsoft.com/vision/cambridge/i2i/DSWeb.htm http://web.archive.org/web/20050402081339/research.microsoft.com/vision/cambridge/i2i/DSWeb.htm.

Microsoft Research Cambridge, "i2i: 3D Visual Communication Background substitution", http://web.archive.org/web/20040602061001/research.microsoft.com/vision/cambridge/i2i/bgsubstitution.htm http://web.archive.org/web/20050420000116/research.microsoft.com/vision/cambridge/i2i/bgsubstitution.htm.

Middlebury College, "Stereo Vision Research", http://web.archive.org/web/20040426135301/http://cat.middlebury.edu/stereo/.

Baker et al., A layered approach to stereo reconstruction, In Proc. CVPR, pp. 434-441, Santa Barbara, 1998.

Belhumeur, P.N., "A Bayesian-approach to binocular stereopsis", Int. J. Computer Vision, 19(3):237-260, Aug. 1996.

Bergen et al., "A three-frame algorithm for estimating two-component image motion", IEEE Trans. on Pattern Analysis and Machine Intelligence, 14(9):886-896, 1992.

Boykov et al., "Interactive graph cuts for optimal boundary and region segmentation of objects in N-D images", In Proc. Int. Conf. on Computer Vision, 2001.

Boykov et al., "Fast approximate energy minimization via graph cuts", IEEE Trans. on PAMI, 23(11), 2001.

Chuang et al., "A Bayesian approach to digital matting", In Proc. Conf.Computer Vision and Pattern Recognition, 2001.

Chuang et al., "Video matting of complex scenes", In ACM Trans. on Graphics (SIGGRAPH), 2002.

Cox et al., "A maximum likelihood stereo algorithm", CVIU, 63(3):542-567, 1996.

Criminisi et al., "The SPS algorithm: Patching figural continuity and transparency by Split-Patch Search" In Proc. Conf. Computer Vision and Pattern Recognition, pp. 721-728, 2004.

Criminisi et al., "Gaze manipulation for one to one teleconferencing", In Proc. ICCV, 2003.

Criminisi et al., "Efficient Dense-Stereo and Novel-view Synthesis for Gaze Manipulation in One-to-one Teleconferencing", Technical Report MSR-TR-2003-59, Microsoft, 2003.

Geiger et al., "Occlusions and binocular stereo", Int. J. Computer Vision, 14:211-226, 1995.

Kolmogorov et al., "Multi-camera scene reconstruction via graph cuts", In Proc. ECCV, Copenhagen, Denmark, May 2002.

Kolmogorov et al., "Probabilistic fusion of stereo with color and contrast for bi-layer segmentation", Technical Report MSR-TR-2005-35, Microsoft, 2006.

Kolmogorov et al., "Bi-layer segmentation of binocular stereo video", Computer Vision and Pattern Recognition (CVPR), Jun. 20-25, 2005.

Jojic et al., "Learning flexible sprites in video layers" In Proc. CVPR, Hawaii, 2001.

Ohta et al., "Stereo by intra- and inter-scan line search using dynamic programming", IEEE Trans. on PAMI, 7(2), 1985.

Rother et al., "GrabCut—Interactive foreground extraction using iterated graph cuts", In Proc. ACM Siggraph, 2004.

Rowe et al., "Statistical mosaics for tracking", J. Image and Vision Computing, 14:549-564, 1996.

Ruzon et al., "Alpha estimation in natural images", In Proc. CVPR, pp. 18-25, 2000.

Scharstein et al., "A taxonomy and evaluation of dense two-frame stereo correspondence algorithms", Int. Journal Computer Vision, 47(1-3):7-42, 2002.

Stauffer et al., "Adaptive background mixture models for real-time tracking", In Proc. CVPR, pp. 246-252, 1999.

Torr et al., "An integrated Bayesian approach to layer extraction from image sequences" IEEE Trans. on PAMI, 23(3), 2001.

Wang et al., "Layered representation for motion analysis", In Proc. CVPR, pp. 361-366, New York, Jun. 1993.

* cited by examiner

STEREO IMAGE SEGMENTATION

BACKGROUND

Separating a foreground layer from video in real time may be useful in many applications such as live background substitution, pan/tilt/zoom, object insertion and the like in teleconferencing. Separating a foreground layer in real time demands layer separation to near Computer Graphics quality, including $\alpha$-channel determination as in video-matting, but with computational efficiency sufficient to attain live streaming speed.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Real-time segmentation of foreground from background layers in binocular video sequences may be provided by a segmentation process which may be based on one or more factors including stereo-matching and color. Automatic separation of layers based on color/contrast or from stereo matching alone may include errors. To reduce the errors, likelihoods for stereo-matching, color, and optionally contrast may be fused to infer foreground and/or background layers accurately and efficiently. Although occlusion of pixels may be modeled in the segmentation system, the determined segmentation state of a pixel may be selected from a group comprising foreground and background, where the occluded state is amalgamated into the background state. Alternatively, the occluded state may be an additional optional state for a segmentation state of a pixel.

In one example, the stereo image may be segmented into foreground, background, and/or occluded regions using stereo disparities. The stereo-match likelihood may be fused with a contrast sensitive color model that is initialized or learned from training data. Segmentation may then be solved by an optimization algorithm such as dynamic programming or graph cut. As used herein, optimization may include scoring one or more optional results and selecting the optional result with the score exceeding some threshold or being the best of a plurality of scores. For example, optimization may include selecting the optional result with the highest score. In some cases, scoring of optional results may include considering the optional result with the minimum energy.

In a second example, the stereo-match likelihood may be marginalized over foreground and background hypotheses, and fused with a contrast-sensitive color model that is initialized or learned from training data. Segmentation may then be solved by an optimization algorithm such as a binary graph cut.

A stereo-based image segmentation system for segmenting foreground and background information is demonstrated as described below in the application of live background substitution. However, it is to be appreciated that segmentation of foreground and background in images may have various applications and uses.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a stereo image segmentation system, the system described is provided as an example and not a limitation. As those skilled in the art will appreciate, the present examples are suitable for application in a variety of different types of image processing systems.

Figure 1:
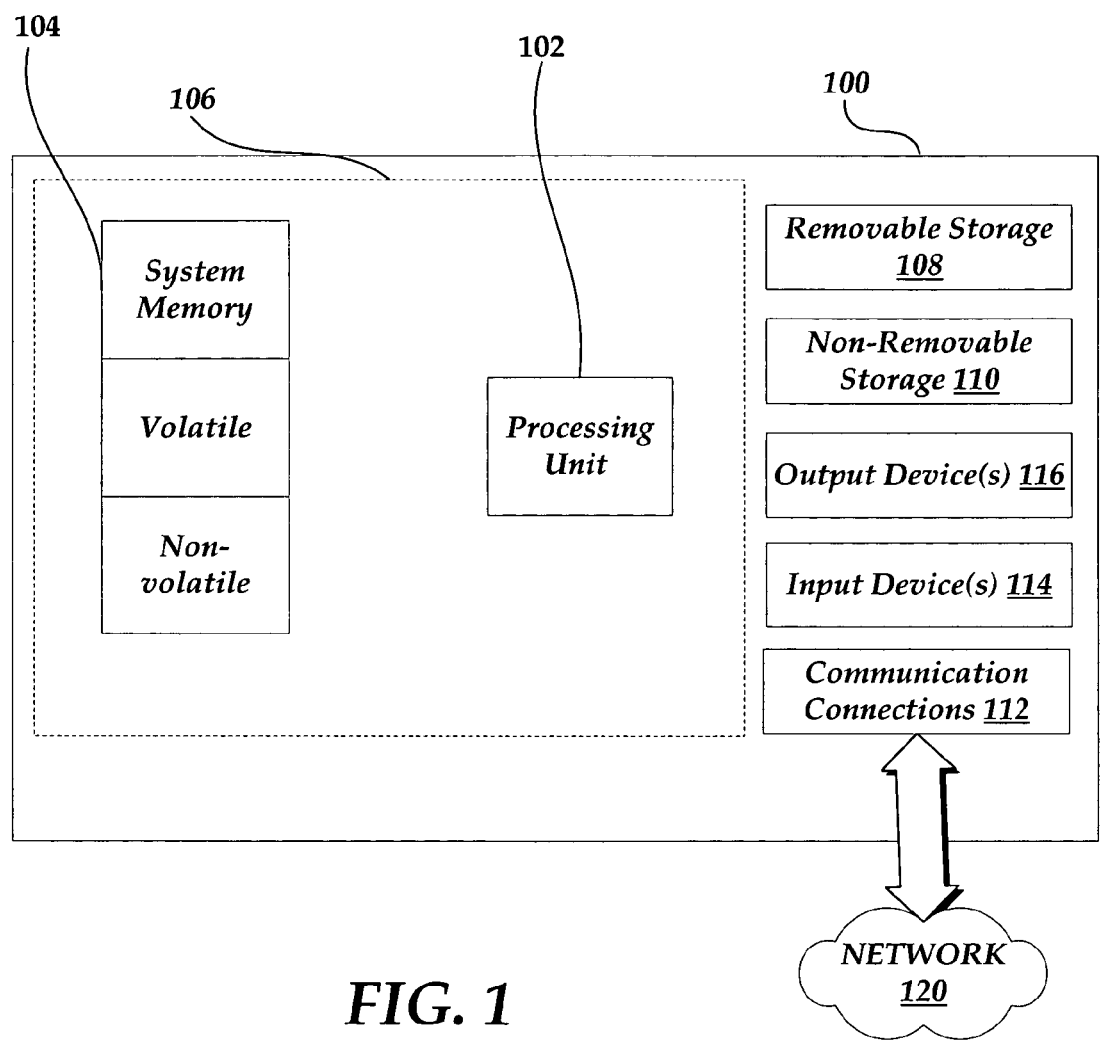
FIG. 1 is an example computing system for implementing a stereo-based segmentation system.

FIG. 1 and the following discussion are intended to provide a brief, general description of a suitable computing environment in which a stereo-based image segmentation system may be implemented to segment the foreground regions of an image from the background regions. The operating environment of FIG. 1 is only one example of a suitable operating environment and is not intended to suggest any limitation as to the scope of use or functionality of the operating environment. Other well known computing systems, environments, and/or configurations that may be suitable for use with a stereo-based image segmentation system described herein include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, the stereo-based image segmentation system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for implementing the stereo-based image segmentation system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 112 that allow the device 100 to communicate with other devices, such as with other computing devices through network 120. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Device 100 may also have input device(s) 114 such as keyboard, mouse, pen, voice input device, touch input device, laser range finder, infra-red cameras, video input devices, and/or any other input device. Output device(s) 116 such as one or more displays, speakers, printers, and/or any other output device may also be included.

Digital video cameras are useful in both consumer and professional contexts. Generally, digital video cameras capture sequences of digital images, which may then be transferred to a computing device for display or processing or to a storage device for storage. One example employs a digital video camera in a video conferencing application. In a typical video conference, an image sequence depicting a conference participant is transmitted to one or more other participants. Concurrently, image sequences depicting the other participants are transmitted to the first participant's display device. In this manner, each participant can view a video stream of images of the other participants during the conference.

Figure 2:
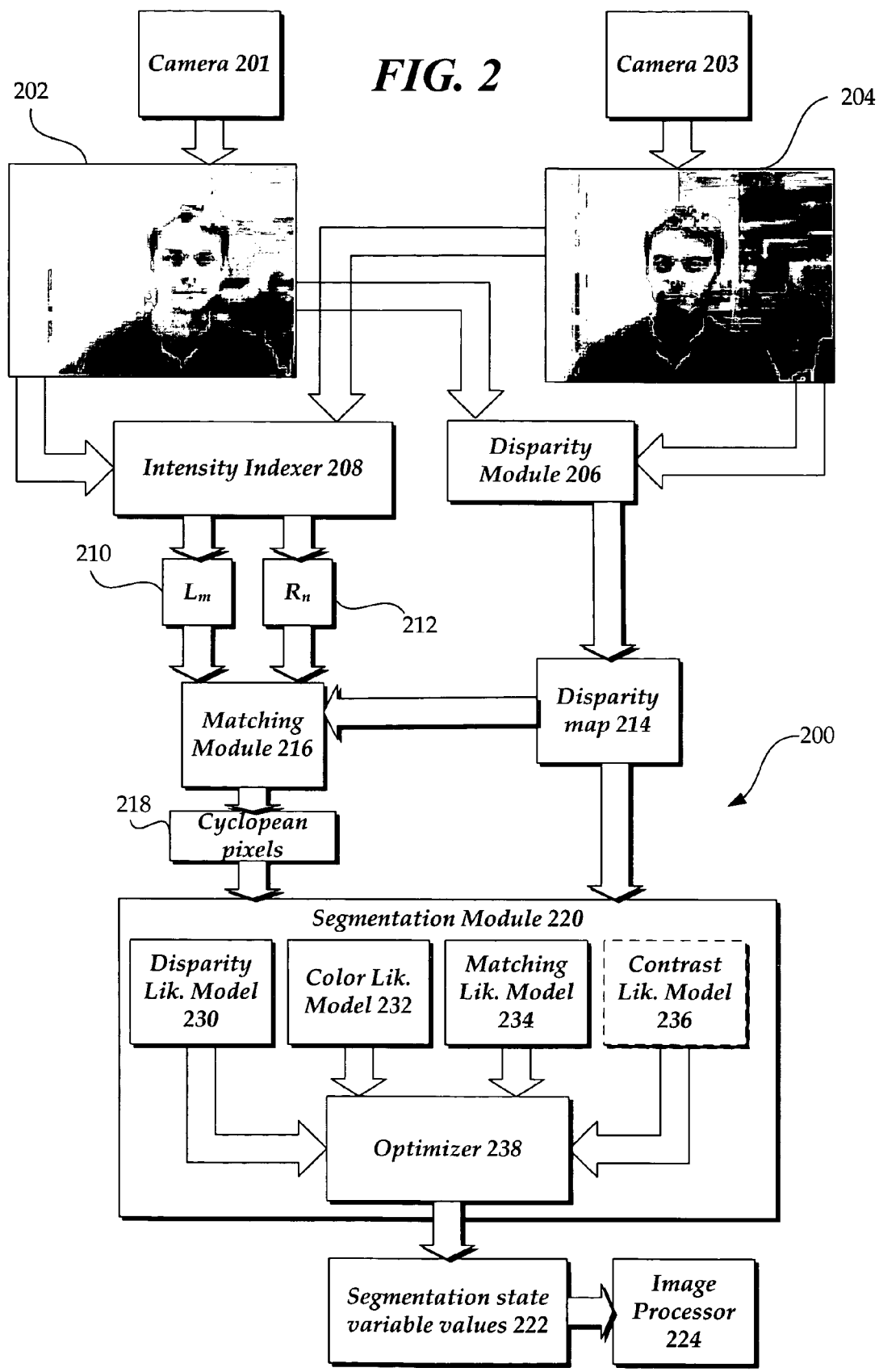
FIG. 2 is a data flow diagram of an example stereo-based segmentation system.

FIG. 2 illustrates an example stereo-based image segmentation system 200 for detecting an object in a stereo-based image. In the stereo-based image processing system, a left image 202 is captured by a camera 201 mounted on the left. Likewise, a right image 204 is captured by a second camera 203 mounted on the right. If the fields of view of each camera overlap at least a portion of the same scene, one or more objects of the scene can be seen in both images.

It is to be appreciated that the stereo-image segmentation system may accept input from more than two cameras, and moreover, the cameras may have alternative orientations and/or locations as long as their respective viewing planes are spatially located from each other and capture at least a portion of the same scene.

The left and right images may be input to an intensity indexer 208 which may index a plurality of the pixels from each image according to their respective intensity. An appropriate amount of pixels from each image may be indexed. For example, the entire left and right images may be indexed, a set of matching epipolar lines (one from each image) may be indexed, and the like. As shown in FIG. 2, the intensity indexer 208 may output the intensity function 210 from the left image and the intensity function 212 for the right image. Over epipolar lines, the intensity function from the left image may be represented as:

$$L=\{L_m, m=0,\ldots,N\} \quad (1)$$

where L is the plurality of index values $L_m$ for the left image for the 0 to N pixels indexed by the index m. Similarly, the intensity function from the right image may be represented as:

$$R=\{R_n, n=0,\ldots,N\} \quad (2)$$

where R is the plurality of index values $R_n$ for the right image for the 0 to N pixels indexed by the index n.

The left and right images 202, 204 may be input to a disparity module 206, which generates a stereo disparity map 214 for each corresponding pair of epipolar lines of the images 202, 204. The disparity map is an array of pixel values which represent the stereo disparity between the left and right images at matching pixels. To generate the disparity values of the disparity map, any suitable dense stereo algorithm may be used. For example, a four-plane model for dynamic programming may be used, although other graphs may be employed, such as a three-plane model, a single plane model, and the like.

Stereo disparity d along the cyclopean (i.e., mid-way between the left and right input cameras) epipolar line may be represented as:

$$d=\{d_k, k=0,\ldots,2N\} \quad (3)$$

where k is a cyclopean coordinate which is the sum of the m coordinate from the left image and the n coordinate from the right image. Disparity is related to the image coordinates (e.g., coordinate m from the left image, and n from the right image) of the matching pixels in the following manner:

$$d_k=m-n \quad (4)$$

where the coordinate m from the left image is defined by:

$$m=(k+d_k)/2 \quad (5)$$

and the coordinate n from the right image is defined by:

$$n=(k-d_k)/2 \quad (6)$$

The indexed left pixels 210 and the right pixels 212 may be used with the disparity map 214 by a matching module 216 to create a set of 2N cyclopean pixels 218. The left and right pixels may be ordered by any particular matching path to give the cyclopean pixels which may be represented as $z=\{z_k, k=0, \ldots, 2N\}$. Any suitable matching process may be used.

One suitable matching process is outlined below for clarity and is discussed further in U.S. patent application Ser. No. 10/681,007, filed Oct. 08, 2003, titled GAZE MANIPULATION. An example matching path is shown in the graph 300 of FIG. 3. The graph 300 illustrates the right pixel coordinates n along the axis 302, and the left pixel coordinates m along the axis 304. The cyclopean pixel coordinates k (equal to the sum of m+n) are illustrated as the line 306. The matching path is illustrated as dashed line 308 which may be created using the disparities from the disparity map. For example, the disparity between two pixels may be measured as the perpendicular distance (shown by line 310) between the cyclopean coordinate line 306 and the matching path 308. In this manner, the disparity gives the distance of the matching path from the cyclopean coordinate line.

In some cases, such as those using dynamic programming and/or graph cuts, described further below, the matching path may include only vertical and/or horizontal moves, e.g., no diagonal or multi-step moves may be allowed. In this manner, for a given matching path, the cyclopean pixels z may comprise a sequence of $L_m$ and $R_n$ elements, such that each left and right pixel appears exactly once on the matching path. In this manner, a consistent probabilistic interpretation may be achieved.

The matched cyclopean pixels z and the disparity map 214 may be input to a segmentation module 220 to segment the foreground from the background. To segment the pixels of the stereo images, each pixel may be defined as either foreground or background. For example, a plurality of pixels in the left, right, and/or cyclopean image may be labeled as foreground, background, or as discussed further below optionally occluded.

The segmentation of the stereo images may be represented as an array x of segmentation state variables (shown as output 222 in FIG. 2), either in cyclopean coordinates (e.g., $x=\{x_k\}$) or image coordinates (e.g., $x=\{x_m\}$ or $\{x_n\}$) where the value of x may indicate F if there is a foreground match or B if there is a background match. In some cases, a pixel may have a value of foreground or background or occluded. In this case, the value of x may indicate F if there is a foreground match, B if there is a background match, or O if one pixel of the matched pair of pixels is occluded in one of the left and right images. The segmentation state variables or labels may have any suitable value, such as binary values, text labels, integer values, real values, and the like. In one example, the segmentation state variable $x_n$ for a pixel n may be of the set of either 0 or 1. In one example, a value of 0 may indicate background, and a value of 1 may be foreground. In some cases, null and/or negative values may be used to indicate a particular state. It is to be appreciated that other labels, values, number of labels and the like may be used.

The segmentation state values (e.g., labels of foreground, background, and/or occluded) and their associated pixels may be used by an image processor 224 to modify and/or process the cyclopean image. For example, the image processor may extract at least a portion of the foreground pixels and composite them with an alternative background image. In another example, at least a portion of the background pixels may be replaced with an alternative background image. The background image may be any suitable image, such as an alternative location scene (e.g., a beach), input from another application such as presentation slides, and the like. In another example, at least a portion of the pixels associated with a segmentation state value indicating a background segment may be compressed at a different fidelity than the foreground pixels. In this manner, the image compression may retain a high fidelity for the foreground pixels, and a lower fidelity for the portion of background pixels. In yet another example, the background pixels may be separated from the foreground pixels and communicated separately to a recipient, such as in a teleconferencing application. Subsequent frames of the teleconference video stream may send the recipient only the foreground pixels, which may be combined with an alternative background image or the stored background pixels from a previous transmission. In another example, a dynamic emoticon may interact with a foreground object in the image. For example, the dynamic emoticon may orbit around the foreground object as described further in U.S. application Ser. No. 11/066946, filed Feb. 25, 2005, which is incorporated herein by reference. In another example, the identified foreground pixels in the image may be used to size and/or place a frame around the foreground pixels of the process image (e.g., smart-framing), any may limit display of the background pixels. It is to be appreciated that the image processor may process or modify a display or stored image using the segmented pixels in any suitable manner and the above image processing description is provided as an example and not a limitation.

Identification of each pixel as foreground or background (or occluded if included) may be done by the segmentation module 220 of FIG. 2 in any suitable manner. For example, segmentation based on a stereo matching and disparity may be fused with color segmentation and optionally contrast segmentation. The resulting image from disparity segmentation alone is not merely fused with an image resulting from color and/or contrast segmentation, but rather, the segmentation module accounts for disparity as well as color and optionally contrast.

For example, similar to Boykov et al., "Interactive graph cuts for optimal boundary and region segmentation of objects in N-D images," In Proc. Int. Conf. on Computer Vision, 2001, and C. Rother et al., "Interactive foreground extraction using iterated graph cuts," ACM Trans. Graph., Vol. 23, No. 3, 2004, pp. 309-314, both of which are incorporated herein by reference, the segmentation problem of an image may be cast as an energy minimization task. The energy function B to be minimized may be given by the sum of data and smoothness terms. For example, the energy function may be given by a sum of the stereo matching and disparity likelihood and the color likelihood, and in some cases the spatial coherence (or contrast) smoothness likelihood. Having defined the energy E, the segmentation variable values x may be determined by estimating the global minimum of the energy equation. Minimization of the energy may be done efficiently through any suitable method, such as using layered dynamic programming, graph-cut, or any other suitable optimization technique.

The Gibbs energies may be defined as probabilistic models of the factors used in the segmentation module 220 of FIG. 2. For example, the segmentation module may consider a disparity likelihood model 230, a matching likelihood model 236, and a color likelihood model 232. The disparity likelihood model may provide a model of the disparity likelihood function, the matching likelihood model 236 may provide a model of the matching likelihood function, and the color likelihood model may provide a model of the color likelihood function. As noted above, the segmentation module may also include a contrast likelihood model 234.

The matching likelihood model 236 may be based on the probability of the cyclopean pixels z given the stereo disparity d and the segmentation state variable values x. The probability p(z|x,d) of the cyclopean pixels given the stereo disparity and the segmentation state variable values may be expanded as:

$$p(z|x, d) = \prod_k p(z_k | x_k, d_k, z_1, \ldots, z_{k-1}) = K(z) \prod_k \exp - \mathcal{L}(x_k, d_k) \quad (7)$$

where the K(z) term is a normalizing function that may be included, and where the pixelwise negative log-likelihood ratio for a match vs. a non-match ($\mathcal{L}(x_k,d_k)$) may be defined as:

$$\mathcal{L}_{(x_k,d_k)} = -\log p(z_k|x,d_k,z_1,\ldots,z_{k-1}) + \log p(z_k|x_k=O) \quad (8)$$

According to the definition, the likelihood that the segmentation state variable indicates occluded (e.g., $\mathcal{L}(x_k=O,d_k)$), is one.

The stereo matches may be scored in any suitable manner. For example, the stereo matches may be scored using sum squared differences (SSD) such as the SSD discussed further in Scharstein et al., "A taxonomy and evaluation of dense two-frame stereo correspondence algorithms," Int. J. Computer Vision, vol. 47, no. 1-3, 2002, pp. 7-42, which is incorporated herein by reference. Using SSD, the score may be the $L^2$-norm of the difference between image patches $L^p_m$, $R^p_m$ surrounding hypothetically matching pixels m,n. In one example, the matching likelihood may be modeled using SSD with additive and multiplicative normalization for robustness to non-Lambertian effects. Normalized SSD (NSSD) is discussed further in U.S. patent application Ser. No.10/681,007, filed Oct. 08, 2003, titled GAZE MANIPULATION, which is incorporated herein by reference. In NSSD, the matching likelihood may be represented as:

$$L_k(x_k, d_k) = \begin{cases} M(L^p_m, R^p_m) - M_0 & \text{if } x \in \{F, B\} \\ 0 & \text{if } x = O \end{cases} \quad (9)$$

where the parameter $M_0$ may be adjusted experimentally or in any other suitable manner. For example, the parameter $M_0$ may be selected by experiments to optimize performance over a test set of images or may be selected from the crossing point of the horizontal axis of the graph of FIG. 4. In some cases, the parameter $M_0$ may be approximately 0.4. The function M may be determined as $\lambda N$ with N begin defined as:

$$\mathcal{N}(L^p, R^p) = \frac{1}{2} \frac{\|L^p - R^p\|^2}{\|L^p - \bar{L}^p\|^2 + \|R^p - \bar{R}^p\|^2} \in [0, 1] \quad (10)$$

and the parameter $\lambda$ indicates the weight given to stereo measurements and may be determined in any suitable manner and may be a constant. For example, the parameter $\lambda$ may be determined from the slope of the graph of FIG. 4 or by experiment as with the parameter $M_0$ above. The parameter $\lambda$ may be determined in any suitable manner, such as running analysis, heuristics, and the like. For example, a unit normalized monochrome patch around 3×7 pixels may have a typical value of $\lambda$=10, although it is to be appreciated that the parameter $\lambda$ may take any appropriate value.

Figure 4:
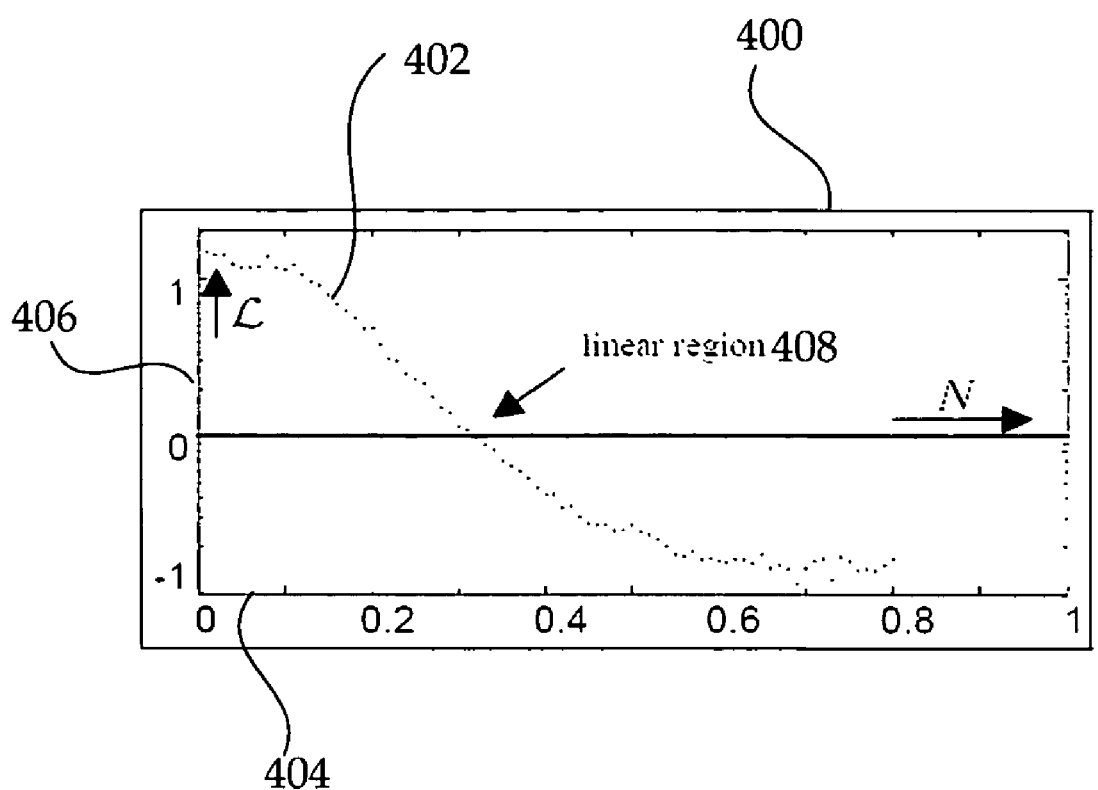
FIG. 4 is a graph illustrating an example stereo likelihood plotted as a function of the normalized sum squared difference measure.

Example results of the matching likelihood given by equations (9) and (10) is shown in FIG. 4. More particularly, the graph 400 of FIG. 4 illustrates the empirical log-likelihood ($-\mathcal{L}$) for stereo matches and is plotted as line 402 with the horizontal axis 404 indicating the value N and the vertical axis indicating the likelihood $\mathcal{L}$. The empirical log likelihood is plotted as function of the NSSD measure $N(L^p, R^p)$ using the ground truth stereo data "Teddy" from the Middlebury data set discussed further under the "new Data" tab at http://www.middlebury.edu/stereo published by Middlebury College. The line 402 is substantially linear in the region 408, where $\mathcal{L}$=0 and is where most data may fall.

Some matching algorithms may allow multiple and/or diagonal moves on the stereo matching paths. However, as noted above, a single-step restriction (as shown in the matching graph 300 of FIG. 3) may provide a consistent probabilistic interpretation of the sequence matching problem. More particularly, by limiting the matching path to single steps, each element $L_m$ and $R_n$ is 'explained' only once, i.e., it appears only once as $z_k$ in the $p(z_k|\ldots)$ term of equation (7). In this manner, each pixel of the stereo images is considered only once, and biasing of the image towards the impact of a portion of the pixels may be reduced. The existence of a probabilistic interpretation then may allow a consistent account of fusion of different modalities, e.g., by multiplication of likelihoods. In this manner, the weighting coefficients of the various energy terms may be determined automatically, from statistics, or in any other suitable manner, and may reduce setting the weighting coefficients by hand.

The color likelihood model 232 of FIG. 2 may be based on any suitable color likelihood model. For example, a two-layer segmentation may model likelihoods for color in foreground and background using Gaussian mixture models. An example suitable Gaussian mixture model for color is outlined here for clarity and described further in U.S. patent application Ser. No. 10/861,771, filed Jun. 3, 2004, titled FOREGROUND EXTRACTION USING ITERATED GRAPH CUTS, which is incorporated herein by reference.

The Gaussian mixture models may be modeled within the red-green-blue (RGB) color space and may be initialized in any suitable manner. For example, the Gaussian mixture model may be learned from training image frames. The training image frames may be any suitable training images, such as images labeled automatically from earlier in the video stream. In another example, the parameters of the Gaussians may be initialized to a default value, such as all pixels may be initialized to background. In either case, as the parameter estimations improve, the effect or influence of the color likelihood in the image segmentation may be increased. For example, the color likelihood could be switched on substantially abruptly when parameters values are initialized. Alternatively, the color term may be dialed in to gradually increase its influence, such as by using a weighting term. The dial in period, may be any suitable period and may be approximately several seconds or in another example approximately 100 frames.

The background model may be enhanced by mixing in a probability density learned, for each pixel, by pixelwise background maintenance. Pixelwise background maintenance is discussed further in Rowe et al., "Statistical mosaics for tracking," J. Image and Vision Computing, Vol. 14, 1996, pp.

549-564, and Stauffer et al., "Adaptive background mixture models for real-time tracking," Proc. CVPR, 1999, pp. 246-252, which are both incorporated herein by reference. As with the Gaussian parameters, the probability density may be initialized in any suitable manner, such as by learning from previously labeled images, bootstrapping initialization by setting pixel labels to default values, and the like.

Using Gaussian mixture models, the foreground color model p(z|x+F) is a spatially global Gaussian mixture initialized or learned from foreground pixels. In the background, there is a similar initialized or learned Gaussian mixture p(z|x+B). The background model may also include a per-pixel single Gaussian density $p_k(z_k)$ available wherever a stability flag indicates that there has been stasis over a sufficient number of previous frames. The stability flag may indicate stability or instability in any particular manner, such as with binary values, textual values, multiple indicators, and the like. The occluded pixels in the input images may be assumed to refer to background pixels, and therefore may share a color model with the background pixels, e.g., those pixels having a segmentation state variable x=B. In this manner, the combined color model may be given by a color energy $U^C_k$ which may be represented as:

$$U^C_k(z_k, x_k) = \begin{cases} -\log p(z_k|x_k) & \text{if } x = F \\ -\log\left[\left(1 - \frac{s_k}{2}\right)p(z_k|x_k = B) + \frac{s_k}{2}p_k(z_k)\right] & \text{if } x = B, O \end{cases} \quad (11)$$

where $s_k$ is the stability flag indicator having a value of 0 or 1. The background color model illustrates a mixture between the global background model and the pixelwise background model, however, it is to be appreciated that any suitable background and/or foreground models may be used. The use of the pixelwise approach in the background model may allow, in some cases, informative information to be extracted. However, the pixelwise approach may be sensitive to movement in the background, which effect may be decreased by adding the global background distribution $p(z_k|x_k+B)$ as the contamination component in the mixture. Since the foreground subject is most likely moving and the cameras stationary, a majority of the background may be unchanging over time. However, it is to be appreciated that the pixelwise and/or global portions of the background portion of equation (11) may be removed for simplicity or any other suitable reason.

A contrast likelihood model, such as contrast likelihood model 234 of FIG. 2, may improve segmentation boundaries to align with contours of high image contrast. Any suitable color contrast model may be used, such as the contrast likelihood model discussed further in Boykov, et al., "Interactive graph cuts for optimal boundary and region segmentation of objects in N-D images," Proc. Int. Conf. on Computer Vision, 2001, which is incorporated herein by reference and outlined here for clarity.

The contrast energy V based on color contrast may be represented as:

$$V_{k,k'} = Y I[x_k, x_{k'}] V^*(z_k, z_{k'}) \quad (12)$$

where k and k' are neighboring pixel-pairs in the cyclopean image. The parameter Y is a strength parameter for the coherence prior and the contrast likelihood, and may be adjusted experimentally as above with the parameter $M_0$. In some cases, the parameter Y may be set approximately equal to 10. The function $I[x_k, x_{k'}]$ is a binary switch that is active across a transition in or out of the foreground state. The binary switch may be represented as:

$$I[x_k, x_{k'}] = \begin{cases} 1 & \text{if } (x_k, x_{k'}) \in \{(F, O), (O, F), (B, F), (F, B)\} \\ 0 & \text{otherwise} \end{cases} \quad (13)$$

The term V* from equation (12) applies contrast sensitivity, which may be represented as:

$$V*(z, z') = \frac{1}{1+\epsilon}\left(\epsilon + \exp - \frac{\|z - z'\|^2}{2\sigma^2}\right) \quad (14)$$

where the parameter $\sigma^2$ is the mean over all pairs of neighbors in the left and right images and may be determined using:

$$\sigma^2 = \langle \|z - z'\|^2 \rangle \quad (15)$$

and where the parameter ∈ is a dilution constant for contrast. In some cases, the dilution constant ∈ may be set to zero for pure color and contrast segmentation. However, in many cases where the segmentation is based on more than the color contrast, the dilution constant may be set to any appropriate value, such as 1. In this manner, the influence of the contrast may be diluted in recognition of the increased diversity of segment cues, e.g., from disparity, stereo matching and/or color.

The contrast energy determined by summing the $V_{k,k'}$ over all neighboring pixel pairs represents a combination of an Ising prior for labeling coherence together with a contrast likelihood that acts to partially discount the coherence terms.

Using the above equations for matching likelihood, the matching parameters include the parameters λ and $M_0$. Using the above equations for contrast likelihood, the contrast parameters include the dilution constant ∈, the mean over all pixel neighbors $\sigma^2$, and the strength parameter Y. The parameters for the matching likelihood and/or the contrast likelihood may be collected in a vector Θ which may store the contrast and/or matching parameters in any suitable manner and/or order, such as in a data store.

The disparity likelihood model 230 of FIG. 2 may be determined in any suitable manner. As noted above, the disparity may be determined using layered dynamic programming or layered graph cut. Both examples will be discussed further below; however, it is to be appreciated that other disparity likelihood techniques may be used and fused in a similar manner with color likelihood, matching likelihood, and optionally contrast likelihood.

Layered dynamic program (LDP) may be used to solve for disparity over individual scanlines on the (virtual) cyclopean image $z_k$. LDP is based on the dynamic programming approach together with augmentation of the state space to handle occlusion. LDP with occlusions is discussed further in U.S. patent application Ser. No. 10/681,007, filed Oct. 08, 2003, and titled GAZE MANIPULATION. The LDP may use any number of suitable states, such as three, four, five, or six and may optionally include consideration for occlusions.

Figure 5:
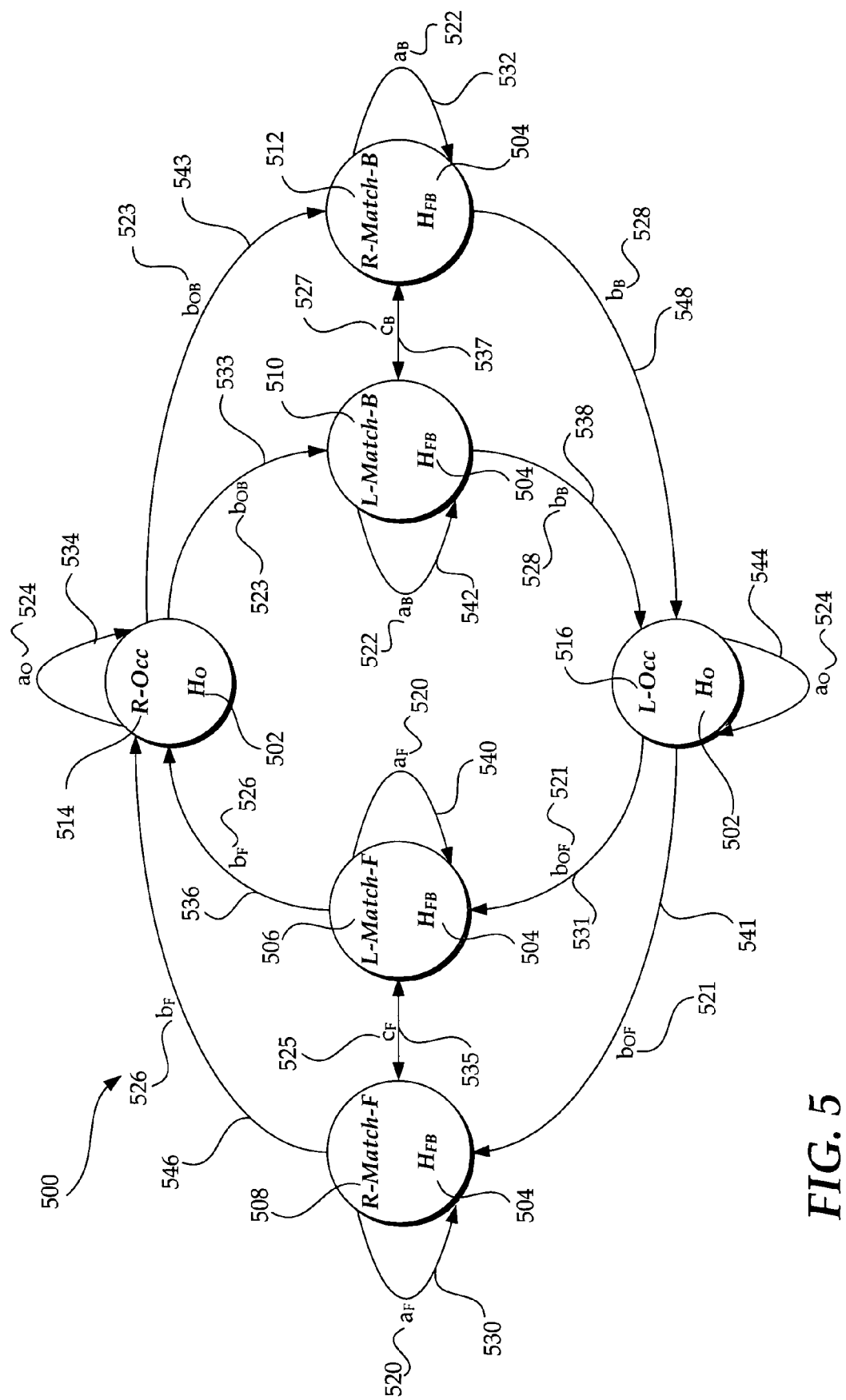
FIG. 5 is an example state transition diagram for use in a layered graph cut.

Additional layers in LDP may include the color likelihood to create a total energy for stereo matching per cyclopean pixel. In this manner, the total energy $E_k$ per pixel in the cyclopean (virtual) image may be represented as a sum of node energies and transition energies (G) respectively representing the cost of a pixel k entering a new state from a previous pixel k-1 and the cost of transitioning to a new state. The node and transition energies may be represented in a state transition diagram. An example state transition diagram 500 is illustrated in FIG. 5.

As noted above, the segmentation state variables x may take on a foreground, background and optional occluded state. However, the foreground and background states each may be split into two states indicating a left or right matching sub-state. For example, with reference to FIG. 5, the foreground state may be split into a foreground left-match state 506 and a foreground right-match state 508. Similarly, the background state may be split into a background left-match state 510 and a background right-match state 512.

Figure 3:
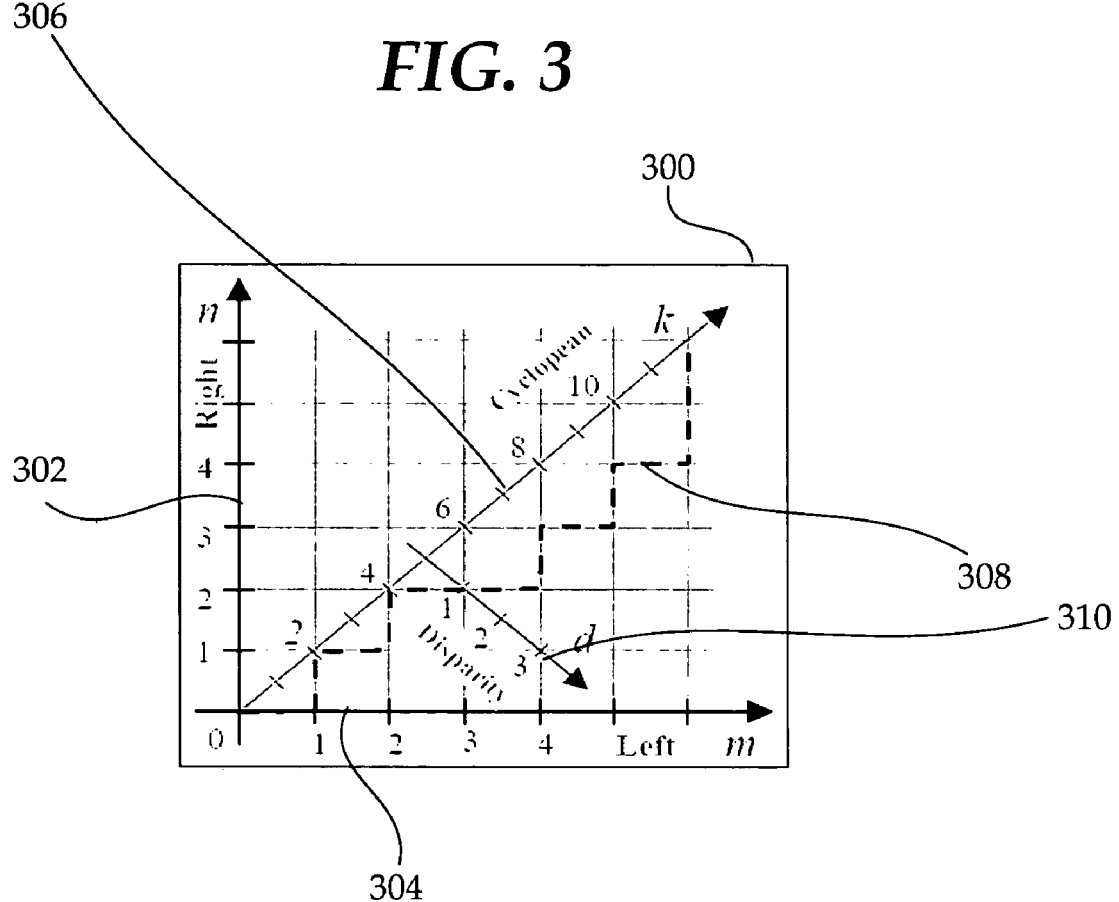
FIG. 3 is a graph illustrating an example stereo disparity as a function f left and right epipolar lines which are defined in terms of pixel coordinates.

The left and right-match states may represent the stepwise progress of the matching path, such as the example matching path shown in FIG. 3. In this manner, the left and right-match states may be determined from the disparities associated with successive cyclopean pixels along an epipolar line in the cyclopean image. For example, the left and right-match states may be represented as:

Left match if $d_k = d_{k-1} + i$ (16)

Right match if $d_k = d_{k-1} - i$ (17)

where i is one when the matching path is limited to single vertical and horizontal steps.

If an occluded state is to be distinguished in the solution of the segmentation state variables, the occluded state may be split into two separate states, e.g., a left-occluded state 514 and right-occluded state 516 as shown in FIG. 5. The left and right-occluded states may not intercommunicate (i.e., allow transitions) to reflect geometric constraints.

With reference to FIG. 5, the node costs $H_{FB}$ 504 and $H_O$ 502 indicate a cost based on the new state of the cyclopean pixels. The node cost of entering a new state may be determined from the terms used to determine the stereo-matching likelihood described above with respect to equation (9), and the color likelihood described above with respect to equation (11).

For example, with reference to FIG. 5, if the state indicates the foreground right-match state 508, the foreground left-match state 506, the background left-match state 510, or the background right-match state 512, then the associated node cost $H_{FB}$ 504 is the sum of the associated matching likelihood cost and the associated color likelihood cost, where the matching likelihood cost is the matching likelihood term $M(L_m, R_n)$ 504 and the associated color likelihood cost is the color likelihood $U^C_k$ as defined by equation (11). Although the occluded state may not be a solution state for the determined segmentation state variables, the occlusion of pixels are present in the model. In determining the segmentation state variables, the occluded state may be amalgamated into the background state. Thus, if the state indicates an occluded state (e.g., right occluded 514 and left occluded 516 shown in FIG. 5), then the node cost 502 of entering either occluded state may be determined from the stereo-matching likelihood parameter $M_O$ 502 and the color likelihood $U^C_k$. More particularly, if the state indicates a left or right occluded state, then the associated matching likelihood cost is the matching parameter $M_O$ and the color likelihood cost is the color likelihood $U^C_k$ as defined by equation (11).

An optional disparity-pull likelihood may be added as a portion of the node cost. The disparity-pull likelihood $U^D_k$ may represent the pull of each layer towards certain disparities, as determined by the densities $p(d_k|x_k = F)$ and $p(d_k|x_k = B)$ and may be represented as:

$U_k^D(z_k, x_k) = -\log p(d_k|x_k)$ (18)

The densities of the disparity-pull likelihood may be determined in any suitable manner. For example, the densities of the disparity-pull likelihood may be initialized as Gaussians in any suitable manner. For example, the Gaussian parameters may be learned from previous image frames. The training image frames may be any suitable training images, such as images labeled automatically from earlier in the video stream. In another example, the parameters of the Gaussians may be initialized to a default value, such as all pixels may be initialized to background. In either case, as the parameter estimations improve, the effect or influence of the disparity-pull likelihood in the image segmentation may be increased. For example, the disparity-pull likelihood could be switched on substantially abruptly when parameter values are initialized. Alternatively, the disparity-pull term may be dialed in to gradually increase its influence, such as by using a weighting term. The dial in period may be any suitable period and may be approximately several seconds or in another example approximately 100 frames.

Generally, the density-pull term pulls the foreground layer towards larger values of disparity, and pulls the background layer toward smaller values of disparity. If the segmentation state variable allows an occluded state, the disparity-pull likelihood may also include the density of the occluded stated $p(d_k|x_k = O)$.

The transition energies indicate a cost $G_{k-1,k}$ of transitioning to a new state (e.g., transitioning from a state k-1 to state k in adjacent pixels in an epipolar line of the cyclopean image). The transition energies may be determined, at least in part, from the stereo disparity model parameters $a_F$, $a_B$, $a_O$, $b_F$, $b_B$, $b_{OF}$, $b_{OB}$, $C_F$, and $C_B$. The stereo disparity model parameters indicate the stereo prior over matching paths.

With reference to the state transition matrix of FIG. 5, the model parameter $a_F$ 520 indicates the transition cost of remaining in the foreground state (e.g., either the foreground right match state 508 or the foreground left match state 506), which is indicated by arcs 530, 540. Similarly, the model parameter $a_B$ 522 indicates the transition cost of remaining in the background state (e.g., either the background left-match state 510 or the background right-match state 512) and is indicated by arcs 532, 542. The model parameter $a_O$ 524 indicates the transition cost of remaining in an occluded state (e.g., either the right-occluded state 514 or the left occluded state 516) and is indicated by arcs 534, 544. The model parameter $b_F$ 526 indicates the cost of transitioning from the foreground state to the right occluded state 514, and is indicated by arcs 536, 546. The model parameter $b_B$ 528 indicates the cost of transitioning from the background state to the left occluded state 516, and is indicated by arcs 538, 548. The model parameter $b_{OF}$ 521 indicates the cost of transition from the left occluded state to the foreground state, either the foreground left match state 506 or the foreground right match state 508, and is indicated by arcs 531, 541. Similarly, the model parameter $b_{OB}$ 523 indicates the cost of transition from the right occluded state to the background state, either the background left match state 510 or the background right match state 512, and is indicated by arcs 533, 543. The model parameter $C_F$ 525 indicates the cost of transitioning between (in any direction) the foreground states, e.g., the foreground left match state 504 and the foreground right match state 508, and is shown by arc 535. Similarly, the model parameter $C_B$ 527 indicates the cost of transitioning between (in any direction) the background states, e.g., the background left match state 510 and the background right match state 512, and is shown by arc 537.

The stereo disparity model parameters may be determined in any suitable manner. In one example, the stereo disparity model parameters may be initialized in any suitable manner. For example, the stereo disparity model parameters may be learned from previously labeled image frames. The training image frames may be any suitable training images, such as images labeled automatically from earlier in the video stream created by segmenting the images using matching likelihood, color likelihood, contrast likelihood, and the like. In another example, the image labels may be initialized to a default value, such as all pixels may be initialized to background. In either case, as the parameter estimations improve, the effect or influence of the disparity model parameters in the transition costs may be increased over time. For example, the disparity model parameters could be switched on substantially abruptly when parameters values are initialized. Alternatively, the disparity model parameters may be dialed in to gradually increase their influence, such as by using a weighting term. The dial in period, may be any suitable period and may be approximately several seconds or in another example, approximately 100 frames.

Since the stereo disparity model parameters indicate the stereo prior over matching paths, each stereo disparity model parameter indicates the probability of escape to another state. More particularly, the probability of escape for a matched state j is $2\exp{-b_j}$. Thus, statistics of the mean widths of matched and occluded objects in the foreground and background may be separately collected and used to determine the disparity model parameters $b_F$, $b_B$, $b_{OF}$, $b_{OB}$ as follows:

$$b_F = \log(2W_{MF}) \quad (19)$$

$$b_B = \log(2W_{MB}) \quad (20)$$

$$b_{OF} = b_{OB} = \log(2W_O) \quad (21)$$

where $W_{MF}$ is the mean width of a matched foreground object, $W_{MB}$ is the mean width of a matched background object, and $W_O$ is the mean width of an occluded object.

The viewing geometry details may be used to determine the disparity model parameters $a_F$ and $a_B$. For example, since the parameters $b_F$ and $b_B$ are the inter-ocular distances (e.g., camera baseline) for the foreground and background, respectively, the disparity model parameters $a_F$ and $a_B$ may be determined using:

$$a_F = \log(1+D_F/b) - \log(1-1/W_{MF}) \quad (22)$$

$$a_B = \log(1+D_B/b) - \log(1-1/W_{MB}). \quad (23)$$

where $D_F$ is a nominal distance to objects in the foreground and $D_B$ is a nominal distance to objects in the background and b is the baseline parameter determined by $$b = \log(2W_M) \quad (24)$$

where $W_M$ is the mean width of a matched object.

Probabilistic normalization may be used to determine the disparity model parameters $C_F$, $C_B$, and $a_O$. For example, the model parameters $c_F$, $c_B$, and $a_O$ may be determined using:

$$c_F = -\log(1-2e^{-b_F}-e^{-a_F}) \quad (25)$$

$$c_B = -\log(1-2e^{-b_B}-e^{-a_B}) \quad (26)$$

$$a_O = -\log(1-2e^{-b_{OB}}) \quad (27)$$

The stereo disparity model parameters may be collected and stored in any suitable manner and in any suitable format. For example, the disparity model parameters may be stored in a vector $\phi$.

In some cases, the contrast likelihood may be combined with the transition energies of FIG. 5 which are based on the disparity model parameters. For example, transition energies between occluding states and foreground states may be modified to account for contrast. For example, the disparity model parameters may be modified as follows:

$$b_{F \rightarrow bF} V^*(z_{k-1}, z_k) \quad (28)$$

$$b_{OF \rightarrow bOF} V^*(z_{k-1}, z_k) \quad (29)$$

Where the function V* is the contrast term discussed above with respect to equation (14).

The total energy per cyclopean pixel in a sequence along an epipolar line, e.g., the sum of the node energies and the transition energies, may be represented as:

$$E_k = U^M_k + G_{k-1,k} + U^C_k + U^D_k \quad (30)$$

where $U^M_k$ is the state cost for entering the new state of pixel k from k-1 along the epipolar line of the cyclopean image, $G_{k-1,k}$ is a transition cost for transferring to a new state of pixel k from pixel k-1 along the epipolar line of the cyclopean image, $U^C_k$ is the color likelihood discussed above with respect to equation (11), and $U^D_k$ is the disparity-pull likelihood which represents the pull of each layer towards certain disparities.

The total energy can be optimized by an optimizer module 238 shown in FIG. 2. The optimizer module may use any suitable optimization scheme, as appropriate. For example, in the above example of total energy of equation (30), a layered dynamic programming optimization may be used. Layered dynamic programming optimization is discussed further in U.S. patent application Ser. No. 10/681,007, filed Oct. 08, 2003, and titled GAZE MANIPULATION.

An alternative method of optimizing a total energy equation may be taken by using layered graph cut (LGC). Layered graph cut determines the segmentation state variable values x as the minimum of an energy function $E(z,x;\Theta)$. Unlike layered dynamic programming, stereo disparity d does not appear explicitly in the layered graph cut energy equation and layered graph cut is specified with respect to one (e.g., the left or the right) image rather than the cyclopean frame as in layered dynamic programming. Rather, disparity is marginalized to give a likelihood p(L|x,R), in which stereo-match likelihoods have been aggregated to compute support for each of the labels in the segmentation state variable values x, e.g., foreground, background, and the optional state of occluded (F,B,O).

Any suitable graph cut algorithm may be used to solve for the segmentation state variables x if the states are limited to foreground and background. However, when optionally the occluded is dealt with, in the optimization, separately from the background state, the segmentation is ternary, so the ∝-expansion form of graph cut may be used. The ∝-expansion form of graph cut is discussed further in Kolmogorov et al., "Multi-camera scene reconstruction via graph cuts," Proc. ECCV, Copenhagen, Denmark, May, 2002, which is incorporated herein by reference.

The energy function in layered graph cut may comprise two terms and an optional third term. Specifically, the energy function E for LGC may be represented as:

$$E(z,x;\Theta) = U^c(z,x;\Theta) + U^s(z,x) + V(z,x;\Theta) \quad (31)$$

where $U^c(z,x;\Theta)$ is the color likelihood and $U^s(z,x)$ is a stereo energy discussed further below. The term $V(z,x:\Theta)$ is the optional consideration of the spatial coherence and contrast likelihood.

The color likelihood $U^c(z,x;\Theta)$ is the sum over the N pixels m in the left (or right image) which may be represented as:

$$U^C(z, x; \Theta) = \sum_m U^C_m(L_m, x_m) \quad (32)$$

where $U^c_m(L_m, x_m)$ is the color energy described above with respect to equation (11).

The optional coherence/contrast energy $V(z,x:\Theta)$ is a sum of pairwise energies of the form of equation (12), however, will be applied to all horizontal, diagonal, and vertical cliques in the left (or right) image. Similar to the layered dynamic programming discussed above, layered graph cuts may enforce geometric constraints along horizontal edges by prohibiting infeasible state transitions, (e.g., from occluded to background or from foreground to occluded).

The stereo energy $U^s(z,x)$ captures the influence of stereo matching likelihood on the probability of a particular segmentation. The stereo energy $U^s(z,x)$ may be defined as:

$$U^S(z, x) = \sum_m U^S_m(x_m) \qquad (33)$$

where the term $U^s_m(x_m)$ is defined by:

$$U^s_m(x_m) = -\log p(L_m|x_m, R) + \text{constant} \qquad (34)$$

where the probability term of equation (32) is defined by:

$$p(L_m|x_m, R) = \sum_d p(L_m|x_m, d_m = d, R)p(d_m = d|x_m) \qquad (35)$$

which marginalizes over the disparity to replace disparity information with the segmentation state variable values. More particularly, small disparity values may be considered background and larger disparity values may be considered foreground. The first term $p(L_m|x_m,d_m+d,R)$ comprises the match cost array. The foreground/background disparity distributions $p(d_m+d|x_m)$ for $x_m$ being either foreground or background may be initialized in any suitable manner. For example, the disparity distributions may be learned from previously labeled image frames. The training image frames may be any suitable training images, such as images labeled automatically from earlier in the video stream. In another example, the segmentation state variable values may be initialized to a default value, such as all pixels may be initialized to background. In either case, as the parameter estimations improve, the effect or influence of the disparity distributions in the image segmentation may be increased. For example, the stereo energy could be switched on substantially abruptly when the distribution are initialized. Alternatively, the stereo term may be dialed in to gradually increase its influence, such as by using a weighting term. The dial in period may be any suitable period and may be approximately several seconds or in another example, approximately 100 frames.

The constant term in equation (34) may be set to a value to allow a user to make use of the matching likelihood ratio model discussed above. In this manner, the stereo likelihood may be given by:

$$U^S_m(x_m) = -\log\left[\sum_d p(d_m = d|x_m)\exp-\lambda M(L^p_m, R^p_m)\right] - M_0 \qquad (35)$$

Optimizations of total energy which fuses color and stereo, and optionally the contrast, may reduce segmentation error, e.g., mislabeling pixels within the left, right, or cyclopean image. Mislabeling of pixels may lead to artifacts in a display of the image, and the like. The fused stereo and color likelihoods may also reduce artifacts when the background is moving, e.g., a person walks by but is not a part of the foreground of the image. The segmentation errors of the LDP and LGC examples discussed above may be comparable in some cases. A choice on implementation of either example may depend on many factors, which may include considering that the stereo component of the LGC may be done on a graphics co-processor, including the marginalization over disparity. In LDP, however, although stereo-match scores could be computed with the graphics co-processor, communicating the entire cost array $\mathcal{L}(x_k, d_k)$ to the general co-processor may be beyond the bandwidth limitations of some computing system architectures. On the other hand, LDP may be economical in memory usage, in that it may proceed scanline by scanline.

Since the human eye is sensitive to flicker artifacts, the optimized segmentation state variable values may be smoothed in some cases, following the foreground/background segmentation optimization. For example, the segmentation state variable values may be smoothed in any suitable manner, such as with an $\alpha$-matting using SPS as a post-process.

After optimization and optional smoothing, each determined segmentation state variable value may be associated with its associated pixel in any suitable manner. For example, the segmentation state variable values may be stored in an array where the location of the value in the array indicates an associated pixel in the associated left, right, or cyclopean image. In another example, a plurality of pixel locations in the image may be associated with a segmentation state variable value, such as grouping contiguous pixels with a single label, and the like.

Figure 6:
FIG. 6 is an example left input image.
Figure 7:
FIG. 7 is an example image illustrating background replacement of the image of FIG. 6.
Figure 8:
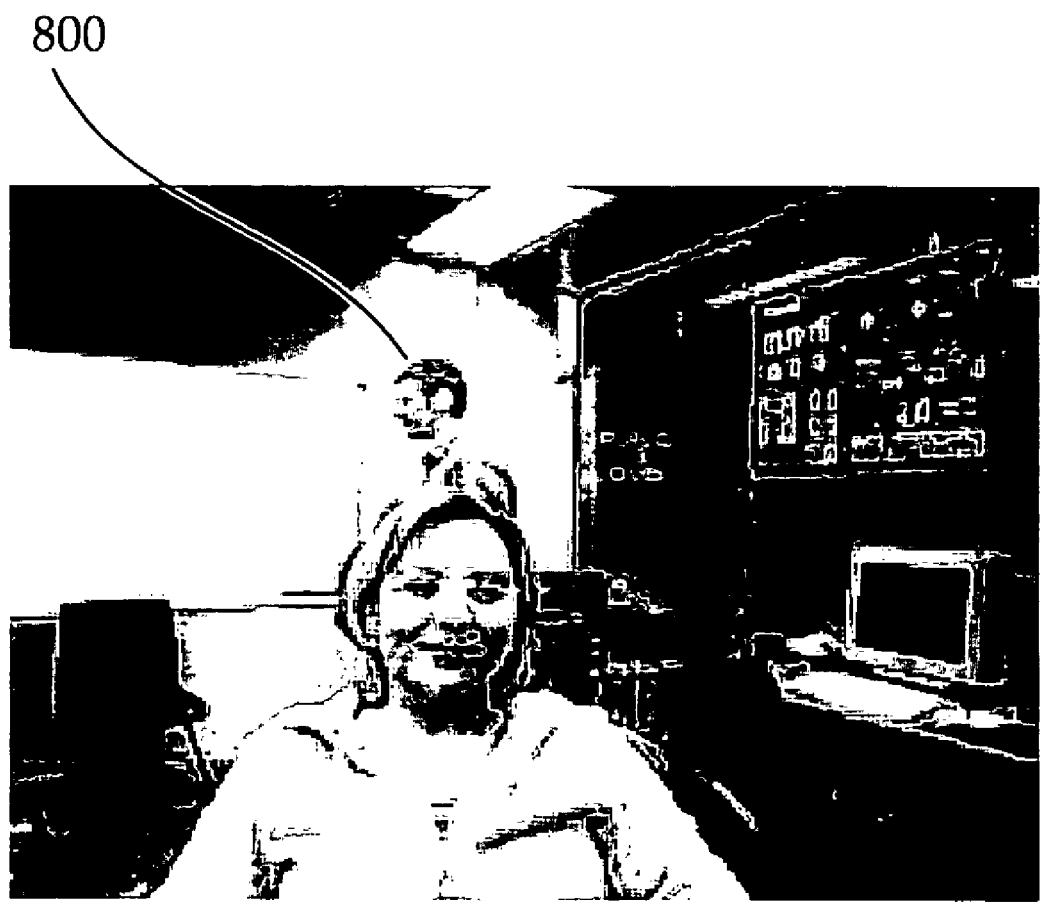
FIG. 8 is an example left input image.
Figure 9:
FIG. 9 is an example image illustrating background replacement of the image of FIG. 8.
Figure 10:
FIG. 10 is an example left input image.
Figure 11:
FIG. 11 is an example image illustrating background replacement of the image of FIG. 10.

The labeled pixels in the image may allow the foreground of the image to be separated from the background of the image during image processing, such as by the image processor 224 of FIG. 2. For example, FIGS. 6-11 illustrate a sequence of images from a video stream illustrating background replacement. FIG. 6 illustrates the left input image; the right input image is not shown. FIG. 7 illustrates an example background replacement of the pixels identified as background pixels in the left image. Similarly, FIG. 8 illustrate the left input image and FIG. 9 illustrates an example background replacement of the pixels identified as background pixels in the left input image of FIG. 8. Similarly, FIG. 10 illustrate the left input image and FIG. 11 illustrates an example background replacement of the pixels identified as background pixels in the left input image of FIG. 10. As shown by the person 800, 1000 moving in the original background of FIGS. 8 and 10, the LGC and LDP implementations of fusing color and stereo likelihoods may be robust, even with motion in the original background.

Figure 12:
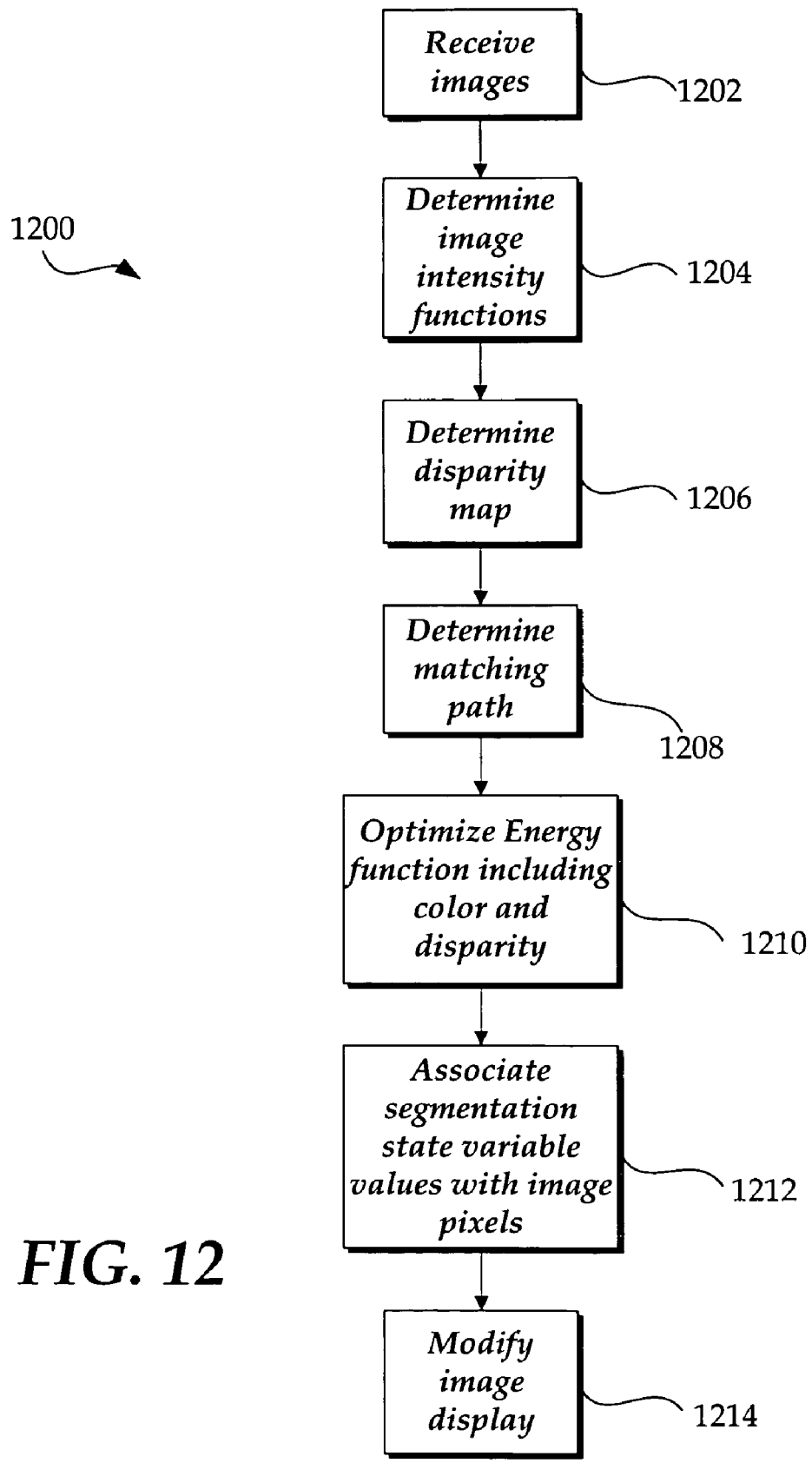
FIG. 12 is a flow chart of an example method of segmenting stereo based images

FIG. 12 illustrates an example method 1200 of segmenting stereo images. The stereo images may be received 1202. For example, the stereo-based segmentation system may receive images from two cameras, e.g., the left and right cameras of FIG. 2. However, it is to be appreciated that any multiple numbers of cameras may be used. The images may be received by retrieving stored images from a data store, may be received from a communication connection, may be received from an input device, and the like. It is to be appreciated that the at least two images may be received in different formats, at different times, and/or over different modes of communication.

The image intensity functions may be determined 1204. For example, with reference to FIG. 2, an intensity indexer 208 may index a plurality of pixels from each of the input images and generate an intensity function for each image. A disparity map may be determined 1206 in any suitable manner. For example, a disparity module 206 may generate a disparity map representing the stereo disparity between the left and right images at matching pixels using any suitable dense stereo algorithm. The matching path may be determined 1208 in any suitable manner. For example, a matching module 216 may determine the cyclopean pixels based upon the pixels of the input images. As noted above, the matching path may be limited to single vertical and horizontal steps. The input images, the image intensity functions, the disparity map, and the cyclopean pixels may be used to optimize 1210 an energy function which includes both color and stereo disparity factors. As noted above, one example optimization may use layered dynamic programming discussed further below with respect to FIG. 13 and another example optimization may use layered graph cut discussed further below with respect to FIG. 14. The optimized energy function provides segmentation state variable values which label a plurality of pixels in the left, right or cyclopean image as either foreground or background, or optionally occluded. The determined segmentation state variable values may be associated 1212 with the image pixels in any suitable manner and may be stored, such as in a data store. It is to be appreciated that any suitable data store in any suitable format may be used to store and/or communicate the segmentation state variable values and the associated image pixels to the image processor 224 of FIG. 2, including a relational database, object-oriented database, unstructured database, an in-memory database, or other data store. A storage array may be constructed using a flat file system such as ACSII text, a binary file, data transmitted across a communication network, or any other file system. Notwithstanding these possible implementations of the foregoing data stores, the term data store and storage array as used herein refer to any data that is collected and stored in any manner accessible by a computer. The image process or may modify 1214 the display of at least a portion of the image pixels based on the associated segmentation state variable values. For example, at least a portion of the background pixels may be replaced with an alternative background image or compressed at a different fidelity than the foreground pixels, the background pixels may be communicated to a recipient separately from the foreground pixels, a dynamic emoticon may interact with a foreground object in the image, and the like.

Figure 13:
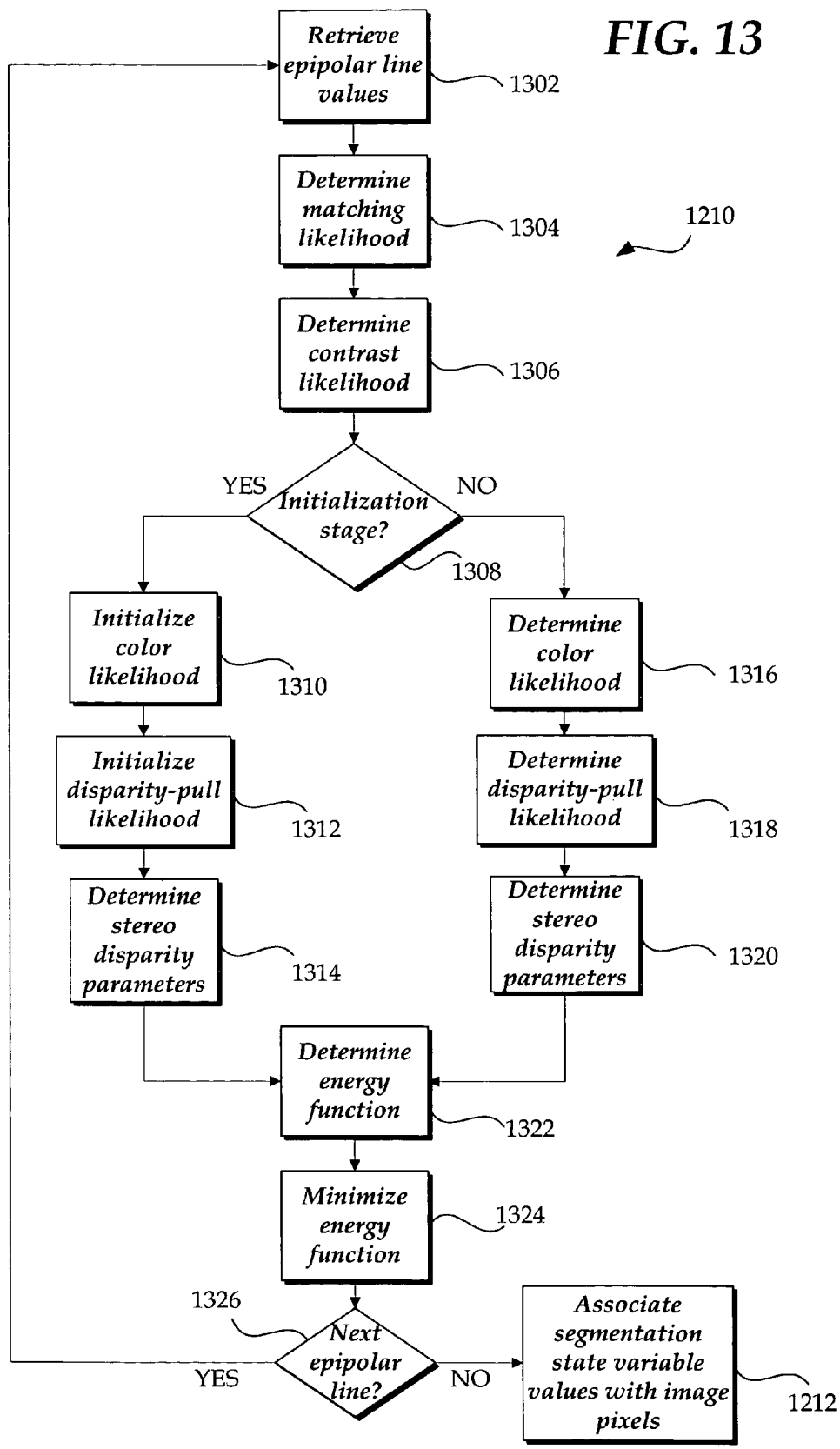
FIG. 13 is a flow chart of an example method of optimizing of FIG. 12.

FIG. 13 illustrates an example method of optimizing 1210 from FIG. 12 the energy function to include both color and disparity using a layered dynamic programming approach. The intensity and disparity data for an epipolar line may be retrieved 1302. The matching likelihood may be determined 1304. For example, the matching likelihood may be determined in any suitable manner, such as described above with reference to equation (9). In one optional implementation, the contrast likelihood may be determined 1306. The contrast likelihood may be determined in any suitable manner, such as that described above with respect to equation (12).

If the image being processed is one of the initial images and/or the color likelihood, disparity-pull likelihood, and/or the stereo disparity model parameters are being initialized 1308, the method may proceed to initializing 1310 the color likelihood. For example, the foreground and background Gaussian mixtures may be learned from previously labeled image frames or may be boostrapped by initializing the segmentation state variable values to a default value. The optional disparity-pull likelihood may be initialized 1312 in any suitable manner. For example, the densities of the disparity-pull likelihood discussed above with reference to equation (18) may be learned as Gaussians from labeled data in previous frames or may be boostrapped by initializing the segmentation state variable values to a default value. The stereo disparity model parameters may be determined 1314 in any suitable manner. For example, the stereo disparity model parameters may be learned from statistics and geometry of the input images and may be collected separately for the foreground and background labeled pixels in previous frames, or may be initialized as discussed above with reference to equations (19)-(27).

If the initialization stage 1308 is over, the color likelihood may be determined 1316 in any suitable manner, such as by using the color likelihood described above with respect to equation (11). As noted above, the color likelihood may be dialed in, such as by using a weighting term which changes value over time or in response to changes in confidence in the initialized color likelihood. The disparity-pull likelihood may be determined 1318 in any suitable manner, such as by using the disparity-pull likelihood discussed above with reference to equation (18). As noted above, the disparity pull likelihood may be dialed in, such as by using a weighting term which changes value over time or in response to changes in confidence in the initialized disparity pull likelihood. The stereo disparity parameters may be determined 1320 in any suitable manner. For example, the initialized disparity model parameters may be retrieved from memory. In one optional embodiment, one or more of the disparity model parameters may be modified to include the effects of contrast as discussed above with reference to equations (28) and (29). As noted above, the disparity model parameters may be dialed in, such as by using a weighting term which changes value over time or in response to changes in confidence in the initialized parameter values.

The energy function may be determined 1322 in any suitable manner. For example, the total energy per pixel in an epipolar line may be determined by summing the node and transition energies using a state transition diagram, such as that shown in FIG. 5. The node energies may include the matching likelihood, the color likelihood, and the optional disparity-pull likelihood. The transition energies may be based on the optional contrast likelihood and the stereo disparity model parameters. The total energy function may be minimized 1324 in any suitable manner, for example, by using layered dynamic programming.

If other epipolar lines remain to be processed 1326, the method may return retrieving information for the next epipolar line 1302. If no other epipolar lines remain, the method may return to the method of FIG. 12 and the segmentation state variables resulting from the minimization of the energy function may be associated 1212 with the image pixels in any suitable manner, as discussed above.

Figure 14:
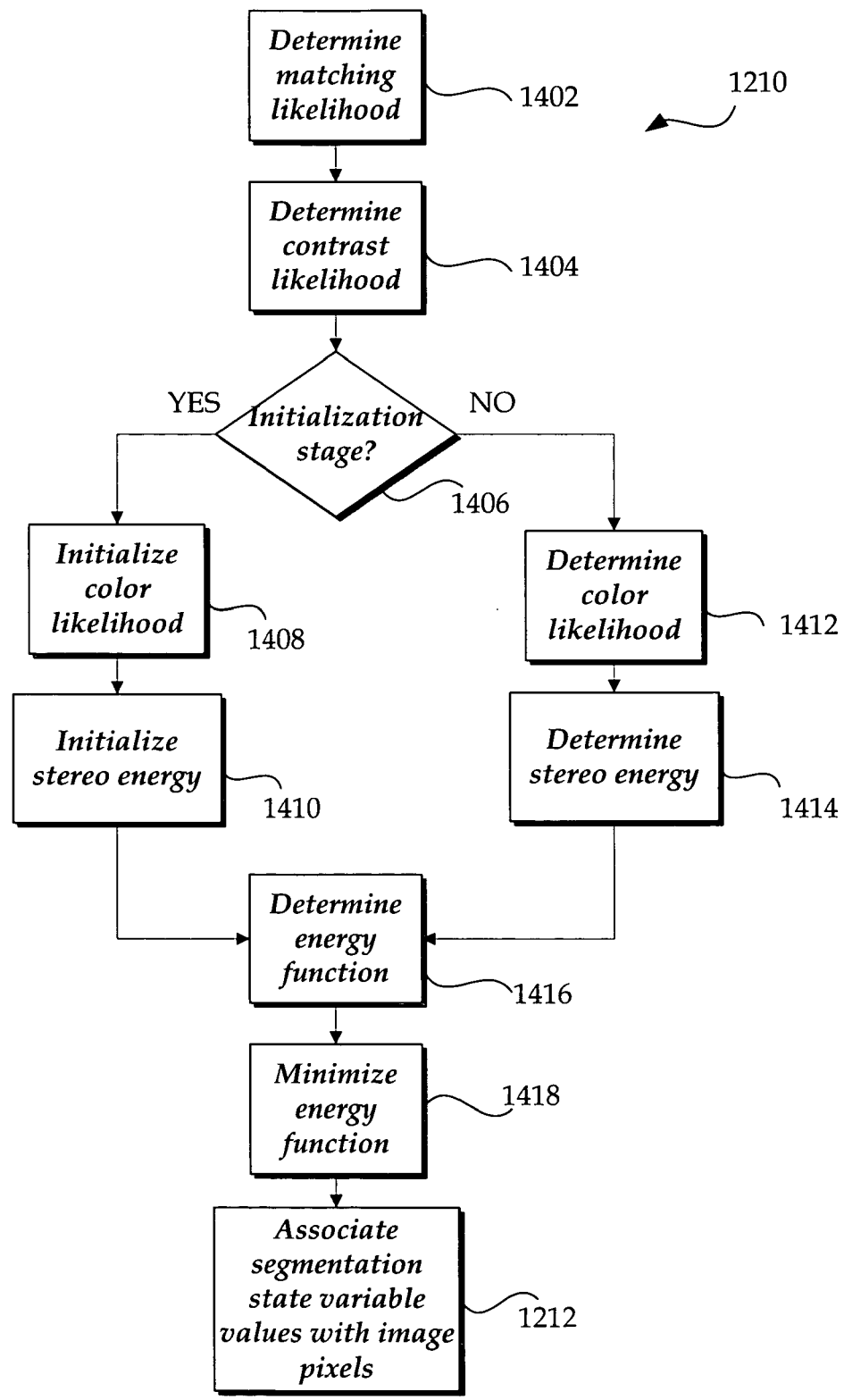
FIG. 14 is a flow chart of another example method of optimizing of FIG. 12.

FIG. 14 illustrates an example method of optimizing 1210 from FIG. 12 the energy function to include both color and disparity using a layered graph cut approach. The matching likelihood may be determined 1402 in any suitable manner, such as described above with reference to equation (9). In one optional implementation, the contrast likelihood may be determined 1404. The contrast likelihood may be determined in any suitable manner, such as that described above with respect to equation (12).

If the image being processed is one of the initial images and/or the color likelihood and/or the stereo energy is being initialized 1406, the method may proceed to initializing 1408 the color likelihood. For example, the foreground and background Gaussian mixtures may be learned from previously labeled image frames or may be boostrapped by initializing the segmentation state variable values to indicate a default value. As noted above, the color likelihood may be dialed in, such as by using a weighting term which changes value over time or in response to changes in confidence in the initialized color likelihood.

The stereo energy may be initialized 1410 in any suitable manner, such as by learning the distributions for $x_m$ being foreground or background from previously labeled image frames or by bootstrapping with initializing the segmentation state variable values to a default value. As noted above, the stereo energy may be dialed in, such as by using a weighting term which changes value over time or in response to changes in confidence in the initialized stereo energy.

If the initialization stage is over, 1406, the color likelihood may be determined 1412 in any suitable manner, such as by using the color likelihood described above with respect to equation (11). The stereo energy may be determined 1414 in any suitable manner. For example, the stereo energy may be determined using equation (33) above.

The energy function may be determined 1416 in any suitable manner. For example, the total energy may be determined by summing the color likelihood, the contrast likelihood, the matching likelihood, and the stereo energy, as described above with reference to equation (31). The energy function may be minimized 1418 in any suitable manner, such as by using a layer graph cut. The method 1400 may return to the method of FIG. 12 and the segmentation state variables resulting from the minimization of the energy function may be associated 1212 with the image pixels in any suitable manner, as discussed above.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more computer-readable storage media containing computer-executable instructions stored thereon, that when implemented by a computer, cause the computer to perform a method comprising:
   a) receiving a first image and a second image, at least a portion of the first image representing a first view of a scene and at least a portion of the second image representing a second view of the scene;
   b) determining a first image intensity function of the first image;
   c) determining a second image intensity function of the second image;
   d) determining a disparity map based on the first image and the second image;
   e) determining a cyclopean image based on the first image and the second image;
   f) determining an energy function including a matching likelihood, a color likelihood, and a stereo disparity likelihood based on the first image intensity function, the second image intensity function, the disparity map and the cyclopean image;
   g) optimizing the energy function to determine a segmentation state variable value for a plurality of pixels in a reference image, the reference image including the first image, the second image, or the cyclopean image, the segmentation state variable value indicating a segmentation layer of the pixel, the segmentation layer being a member of a group comprising a foreground layer and a background layer.

2. The computer readable media of claim 1, wherein determining a cyclopean image includes preventing movement of a matching path in a diagonal direction.

3. The computer readable media of claim 1, wherein determining the energy function includes weighting at least one member of a group consisting of the color likelihood, the stereo disparity likelihood, and a contrast likelihood in response to a confidence in the at least one member.

4. The computer readable media of claim 1, wherein optimizing includes using one member of a group consisting of layered dynamic programming and layered graph cut.

5. A computer-implemented method using a processor to perform the steps of:
   a) receiving a first image and a second image, at least a portion of the first image representing a first view of a scene and at least a portion of the second image representing a second view of the scene;
   b) determining a first image intensity function of the first image;
   c) determining a second image intensity function of the second image;
   d) determining a disparity map based on the first image and the second image;
   e) determining a cyclopean image based on the first image and the second image;
   f) determining an energy function including a matching likelihood, a color likelihood, and a stereo disparity likelihood based on the first image intensity function, the second image intensity function, the disparity map and the cyclopean image;
   g) optimizing the energy function to determine a segmentation state variable value for a plurality of pixels in a reference image, the reference image including the first image, the second image, or the cyclopean image, the segmentation state variable value indicating a segmentation layer of the pixel, the segmentation layer being a member of a group comprising a foreground layer and a background layer.

6. The computer-implemented method of claim 5, wherein determining a cyclopean image includes preventing movement of a matching path in a diagonal direction.

7. The computer-implemented method of claim 5, wherein determining the energy function includes weighting at least one member of a group consisting of the color likelihood, the stereo disparity likelihood, and a contrast likelihood in response to a confidence in the at least one member.

8. The computer-implemented method of claim 5, wherein optimizing includes using one member of a group consisting of layered dynamic programming and layered graph cut.

9. A system comprising one or more computer-readable storage media storing computer-executable instructions and processor for executing said computer-executable instructions to perform the steps of:
   a) receiving a first image and a second image, at least a portion of the first image representing a first view of a scene and at least a portion of the second image representing a second view of the scene;
   b) determining a first image intensity function of the first image;
   c) determining a second image intensity function of the second image;
   d) determining a disparity map based on the first image and the second image;
   e) determining a cyclopean image based on the first image and the second image;
   f) determining an energy function including a matching likelihood, a color likelihood, and a stereo disparity likelihood based on the first image intensity function, the second image intensity function, the disparity map and the cyclopean image;
   g) optimizing the energy function to determine a segmentation state variable value for a plurality of pixels in a reference image, the reference image including the first image, the second image, or the cyclopean image, the segmentation state variable value indicating a segmentation layer of the pixel, the segmentation layer being a member of a group comprising a foreground layer and a background layer.

10. The system of claim 9, wherein determining a cyclopean image includes preventing movement of a matching path in a diagonal direction.

11. The system of claim 9, wherein determining the energy function includes weighting at least one member of a group consisting of the color likelihood, the stereo disparity likelihood, and a contrast likelihood in response to a confidence in the at least one member.

12. The system of claim 9, wherein optimizing includes using one member of a group consisting of layered dynamic programming and layered graph cut.

* * * * *